(12) United States Patent
Xu et al.

(10) Patent No.: US 11,148,569 B2
(45) Date of Patent: Oct. 19, 2021

(54) TURNOVER MECHANISM

(71) Applicant: YANFENG ADIENT SEATING CO. LTD., Shanghai (CN)

(72) Inventors: Jie Xu, Shanghai (CN); Qing Song, Shanghai (CN); Donghai Xu, Shanghai (CN)

(73) Assignee: YANFENG ADIENT SEATING CO. LTD., Shanghai (CN)

( * ) Notice: Subject to any disclaimer, the term of this patent is extended or adjusted under 35 U.S.C. 154(b) by 0 days.

(21) Appl. No.: 16/767,695

(22) PCT Filed: Nov. 28, 2018

(86) PCT No.: PCT/CN2018/117955
§ 371 (c)(1),
(2) Date: May 28, 2020

(87) PCT Pub. No.: WO2019/105387
PCT Pub. Date: Jun. 6, 2019

(65) Prior Publication Data
US 2020/0384903 A1     Dec. 10, 2020

(30) Foreign Application Priority Data
Nov. 29, 2017 (CN) .......................... 201711230248.7

(51) Int. Cl.
*B60N 2/859* (2018.01)
*B60N 2/844* (2018.01)
(Continued)

(52) U.S. Cl.
CPC ............ *B60N 2/859* (2018.02); *B60N 2/844* (2018.02); *B60N 2/847* (2018.02); *B60N 2/853* (2018.02)

(58) Field of Classification Search
None
See application file for complete search history.

(56) References Cited

U.S. PATENT DOCUMENTS 8,979,203 B1 * 3/2015 Sutter, Jr. .............. B60N 2/847
                                                                297/408
9,132,756 B1 * 9/2015 Witte .................... B60N 2/844
(Continued)

FOREIGN PATENT DOCUMENTS

CN        201841979 U      5/2011
CN        202641431 U      1/2013
(Continued)

OTHER PUBLICATIONS

International Search Report dated Feb. 2, 2019 in connection with PCT International Application No. PCT/CN2018/117955.
(Continued)

*Primary Examiner* — David E Allred
(74) *Attorney, Agent, or Firm* — John P. White (57) ABSTRACT

A turnover mechanism is disclosed. The turnover mechanism includes a bracket assembly, a rotatable cam, a cam resetting component, a locking pawl piece, a rotating shaft, and a rotating shaft resetting torsion spring. The cam is axially disposed on the bracket assembly. The cam resetting component is connected to the cam and the bracket assembly. The locking pawl piece is axially disposed on the bracket assembly. The cam drives the locking pawl piece to move between a locked state and an unlocked state through forward and reverse movements. The rotating shaft is axially disposed on the bracket assembly and is provided with a locking tooth plate. When the locking pawl piece is in the locked state, a locking pawl in the locking pawl piece and a locking groove on the locking tooth plate are locked and engaged, and the rotating shaft and the bracket assembly are restricted from relative rotation by the locking tooth plate. When the locking pawl piece is at an unlocked position, the locking pawl in the locking pawl piece and the locking groove on the locking tooth plate are unlocked and disengaged, and the rotating shaft and the bracket assembly are (Continued)

rotatable relatively. The rotating shaft resetting torsion spring is connected to the locking tooth plate and the bracket assembly. The rotating shaft resetting torsion spring drives the locking tooth plate and the rotating shaft to rotate relative to the bracket assembly.

11 Claims, 9 Drawing Sheets

(51) Int. Cl.
  *B60N 2/853* (2018.01)
  *B60N 2/847* (2018.01)

(56) References Cited

U.S. PATENT DOCUMENTS

| | | | | |
|---|---|---|---|---|
| 9,409,503 | B2* | 8/2016 | Little | B60N 2/844 |
| 2009/0152924 | A1* | 6/2009 | Kim | B60N 2/856 |
| | | | | 297/408 |
| 2014/0015296 | A1* | 1/2014 | Ogata | B60N 2/366 |
| | | | | 297/340 |
| 2014/0070586 | A1* | 3/2014 | Tachikawa | B60N 2/206 |
| | | | | 297/340 |
| 2014/0167476 | A1* | 6/2014 | Wang | B60N 2/844 |
| | | | | 297/391 |
| 2014/0210245 | A1* | 7/2014 | Tobata | B60N 2/844 |
| | | | | 297/408 |
| 2014/0265507 | A1* | 9/2014 | Fredriksson | B60N 2/859 |
| | | | | 297/408 |
| 2018/0319303 | A1* | 11/2018 | Jeong | B60N 2/874 |

FOREIGN PATENT DOCUMENTS

| | | |
|---|---|---|
| CN | 203805740 U | 9/2014 |
| CN | 108016338 A | 5/2018 |
| JP | 2014121910 A | 7/2014 |

OTHER PUBLICATIONS

Written Opinion (form PCT/ISA/237) dated Feb. 2, 2019 in connection with PCT International Application No. PCT/CN2018/117955.

* cited by examiner

TURNOVER MECHANISM

CROSS-REFERENCE TO RELATED APPLICATIONS

This application is a § 371 national stage of PCT International Application No. PCT/CN2018/117955, filed Nov. 28, 2018, claiming priority of Chinese Patent Application No. CN 201711230248.7, filed Nov. 29, 2017, the contents of each of which are hereby incorporated by reference into the application.

BACKGROUND

Technical Field

The invention relates to the technical field of vehicle seats, and more particularly, to a turnover mechanism.

Related Art

A headrest of a vehicle seat is a device provided to improve the ride comfort and safety of a vehicle. Ordinary headrests of vehicle seats can only provide the function of adjusting the height. Such a seat will not only hinder the field of vision of rear seat passengers to make the rear seat passengers feel depressed, but also block the view of rear vehicles.

To this end, the applicant filed a utility model application for a turnover headrest, Authorization Publication No. CN200971065Y, to the State Intellectual Property Office of China on Nov. 24, 2006. The patent includes headrest foam, a headrest insertion rod and a headrest guide sleeve. An upper end of the headrest insertion rod is fixed on the headrest foam and a lower end penetrates into the headrest guide sleeve. A lower end of the headrest insertion rod is provided with a turnover locking notch. The headrest guide sleeve includes a guide sleeve body. A pin shaft is disposed in the guide sleeve body and is provided with a turnover member in a penetration manner. A locking member is disposed in the turnover member and is matched and locked with the turnover locking notch. When the headrest foam is pulled out to the highest position, the guide sleeve restricts the insertion rod from separation, and the headrest foam is turned forward through the guide sleeve, thereby realizing the function of providing a good view for rear seat passengers.

Since the publication of the patent, some seats with turnover headrests have appeared in the industry. However, the turnover headrest structures used in these seats are relatively complicated, the manufacturing cost is relatively high, and there is a problem that the locking is not reliable under the action of an external force.

SUMMARY

The technical problem to be solved by the invention is to provide a turnover mechanism that has a simple structure, is cost-saving, and can be self-locked under the action of an external force to improve the reliability for the above technical problems existing in a turnover headrest currently applied to a seat.

The technical problem to be solved by the invention may be solved by the following technical solutions.

A turnover mechanism includes:
a bracket assembly;
a rotatable cam axially disposed on the bracket assembly;
a cam resetting component connected to the cam and the bracket assembly;
a locking pawl piece axially disposed on the bracket assembly, the cam driving the locking pawl piece to move between a locked state and an unlocked state through forward and reverse movements;
a rotating shaft axially disposed on the bracket assembly and provided with a locking tooth plate, when the locking pawl piece is in the locked state, a locking pawl in the locking pawl piece and a locking groove on the locking tooth plate being locked and engaged, the rotating shaft and the bracket assembly being restricted from relative rotation by the locking tooth plate, when the locking pawl piece is at an unlocked position, the locking pawl in the locking pawl piece and the locking groove on the locking tooth plate being unlocked and disengaged, and the rotating shaft and the bracket assembly being rotatable relatively; and
a rotating shaft resetting torsion spring connected to the locking tooth plate and the bracket assembly, the rotating shaft resetting torsion spring driving the locking tooth plate and the rotating shaft to rotate relative to the bracket assembly.

In a preferred embodiment of the invention, the bracket assembly is assembled by welding a first bracket and a second bracket, the first bracket has a first bracket wall, the second bracket has a second bracket wall, the first bracket wall and the second bracket wall are disposed oppositely and separated by a certain distance to form a part accommodating cavity, the cam, the cam resetting component, the locking pawl piece and the locking tooth plate are all located in the part accommodating cavity, the rotating shaft passes through the part accommodating cavity and is axially disposed on the first bracket wall and the second bracket wall, and both ends of the rotating shaft respectively pass through the first bracket wall and the second bracket wall.

In a preferred embodiment of the invention, the cam is axially disposed on a cam shaft, both ends of the cam shaft are fixedly supported on the first bracket wall and the second bracket wall, the cam resetting component is a cam resetting torsion spring, the cam resetting torsion spring is wound on the cam shaft, one end of the cam resetting torsion spring acts on the cam, and the other end acts on the second bracket wall.

In a preferred embodiment of the invention, the cam has a traction arm and a drive arm, the traction arm is connected to a headrest turnover unlocking cable, when the headrest turnover unlocking cable performs an unlocking operation, the cam is pulled by the traction arm to rotate around the cam shaft to further drive the drive arm to perform an unlocking operation, and the cam resetting torsion spring pulls, by the traction arm, the cam to rotate around the cam shaft to further drive the drive arm to perform a locking operation.

In a preferred embodiment of the invention, the drive arm has an unlocking arc surface and a first locking step surface, the unlocking arc surface being opposite to the locking step surface.

In a preferred embodiment of the invention, the locking pawl piece is fixed on a pawl shaft, both ends of the pawl shaft are axially disposed on the first bracket wall and the second bracket wall, in addition to the locking pawl, the locking pawl piece also includes an unlocking drive arm and a locking drive arm, the locking pawl is provided with a second locking step surface, the second locking step surface is coupled to the first locking step surface on the drive arm in the cam in a locked state, and an inner surface of the unlocking drive arm is coupled to the unlocking arc surface on the drive arm in the cam in an unlocked state.

In a preferred embodiment of the invention, an outer surface of the unlocking drive arm is connected to the second locking step surface of the locking pawl through a first self-locking arc surface, the locking tooth plate is provided with a second self-locking arc surface, and the first self-locking arc surface on the locking pawl piece is coupled to the second self-locking arc surface on the locking tooth plate in a locked state to form self-locking.

In a preferred embodiment of the invention, the rotating shaft resetting torsion spring is wound on the rotating shaft, one end of the rotating shaft resetting torsion spring acts on the locking tooth plate, and the other end of the rotating shaft resetting torsion spring acts on the second bracket wall.

In a preferred embodiment of the invention, the turnover mechanism is installed in a headrest framework, both ends of the rotating shaft are fixedly connected to ends of a pair of headrest support rods extending into the headrest framework, respectively, the bracket assembly is fixedly connected to the headrest framework, and the headrest framework is rotatably supported on the rotating shaft through the bracket assembly.

In a preferred embodiment of the invention, the turnover mechanism is disposed in a backrest framework, the bracket assembly is fixedly connected to the backrest framework, both ends of the rotating shaft are fixedly connected to ends of a pair of headrest support rods extending into the backrest framework, respectively, and the headrest framework is rotatably supported on the bracket assembly through the pair of headrest support rods and the rotating shaft.

Due to the adoption of the above technical solutions, the turnover mechanism of the invention has the advantages of simple structure, cost saving, and self-locking under the action of an external force to improve reliability. The turnover mechanism of the invention may be used not only for turning a headrest, but also for turning between other fixed members and a turnover member.

DETAILED DESCRIPTION

Referring to FIGS. 1 to 4, a turnover mechanism shown in the figures includes a bracket assembly 100, a cam 200, a cam shaft 300, a cam resetting torsion spring 400, a locking pawl piece 500, a pawl shaft 600, a locking tooth plate 700, a rotating shaft 800, and a rotating shaft resetting torsion spring 900.

The bracket assembly 100 is assembled by welding a first bracket 110 and a second bracket 120. The first bracket 110 has a first bracket wall 111. The second bracket 120 has a second bracket wall 121. The first bracket wall 111 and the second bracket wall 121 are disposed oppositely and separated by a certain distance to form a part accommodating cavity 130.

The cam 200 is located in the part accommodating cavity 130 and is axially disposed on the cam shaft 300. Both ends of the cam shaft 300 are fixedly supported on the first bracket wall 111 and the second bracket wall 121. The cam resetting torsion spring 400 is located in the part accommodating cavity 130 and is wound on the cam shaft 300. One end of the cam resetting torsion spring 400 acts on the cam 200, and the other end acts on the second bracket wall 121.

The cam 200 has a traction arm 210 and a drive arm 220. The drive arm 220 has an unlocking arc surface 221 and a first locking step surface 222. The unlocking arc surface 221 is opposite to the locking step surface 222.

The locking pawl piece 500 is located in the part accommodating cavity 130 and is fixed on the pawl shaft 600. Both ends of the pawl shaft 600 are axially disposed on the first bracket wall 111 and the second bracket wall 121. The locking pawl piece 500 includes a locking pawl 510, an unlocking drive arm 520 and a locking drive arm 530. The locking pawl 510 is provided with a second locking step surface 511. An outer surface 521 of the unlocking drive arm 520 is connected to the second locking step surface 511 of the locking pawl 510 through a first self-locking arc surface 540.

The rotating shaft 800 passes through the part accommodating cavity 130 and is axially disposed on the first bracket wall 111 and the second bracket wall 121. Both ends of the rotating shaft 800 respectively pass through the first bracket wall 111 and the second bracket wall 121.

The locking tooth plate 700 is located in the part accommodating cavity 130 and has a bottom welded onto the rotating shaft 800. The locking tooth plate 700 is provided with a locking groove 710. An opening of the locking groove 710 faces upward. In addition, a top surface of the locking tooth plate 700 is provided with a second self-locking arc surface 720.

The rotating shaft resetting torsion spring 900 is located in the part accommodating cavity 130 and is wound on the rotating shaft 800. One end of the rotating shaft resetting torsion spring 900 acts on the locking tooth plate 700, and the other end acts on the second bracket wall 121.

Figure 1:
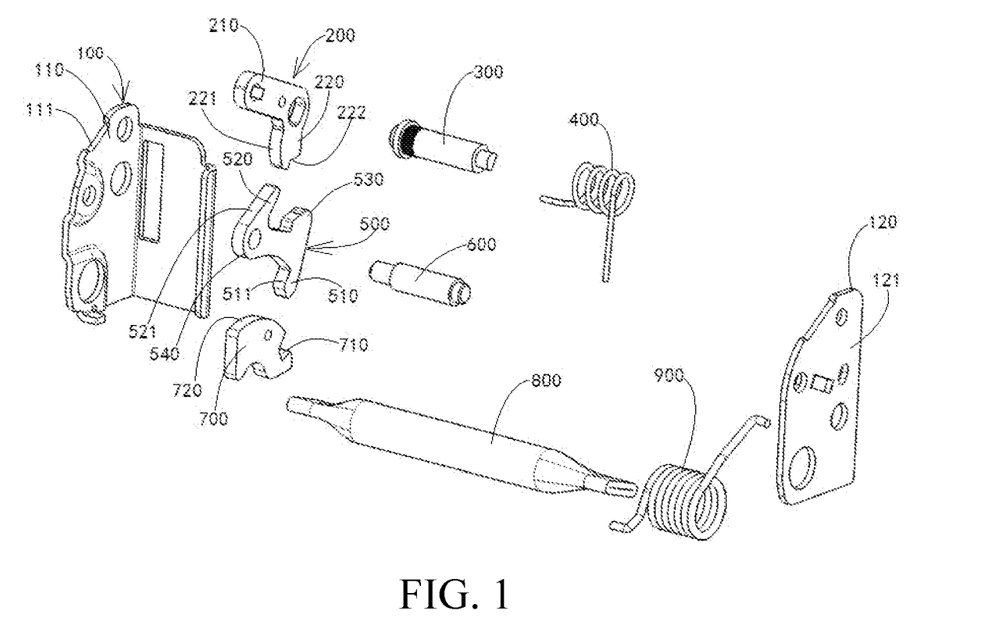
FIG. 1 is a schematic exploded view of all parts of a turnover mechanism of the invention.
Figure 2:
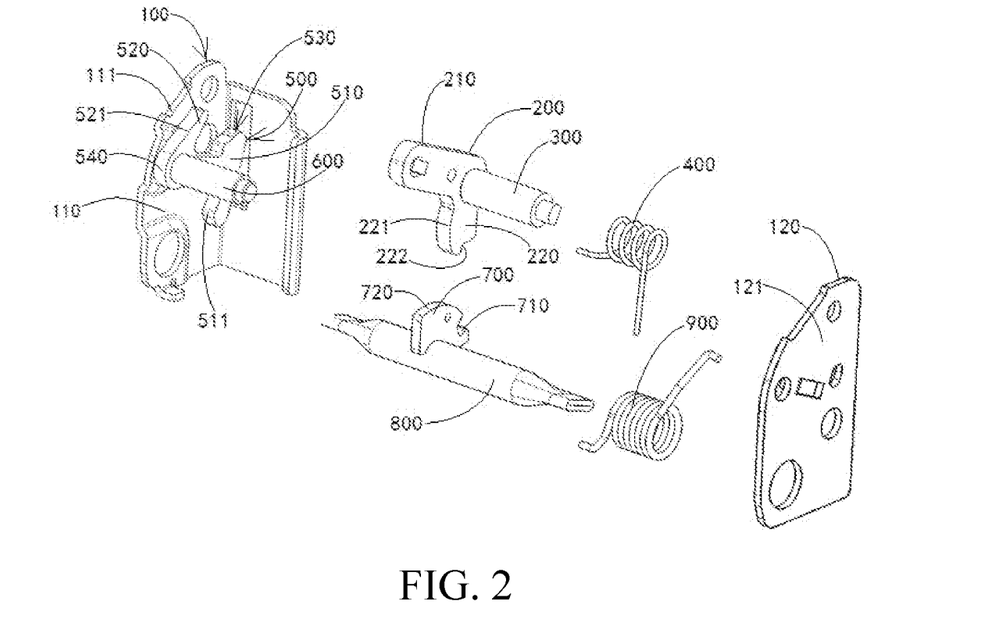
FIG. 2 is a schematic exploded view of some parts of a turnover mechanism of the invention.
Figure 3:
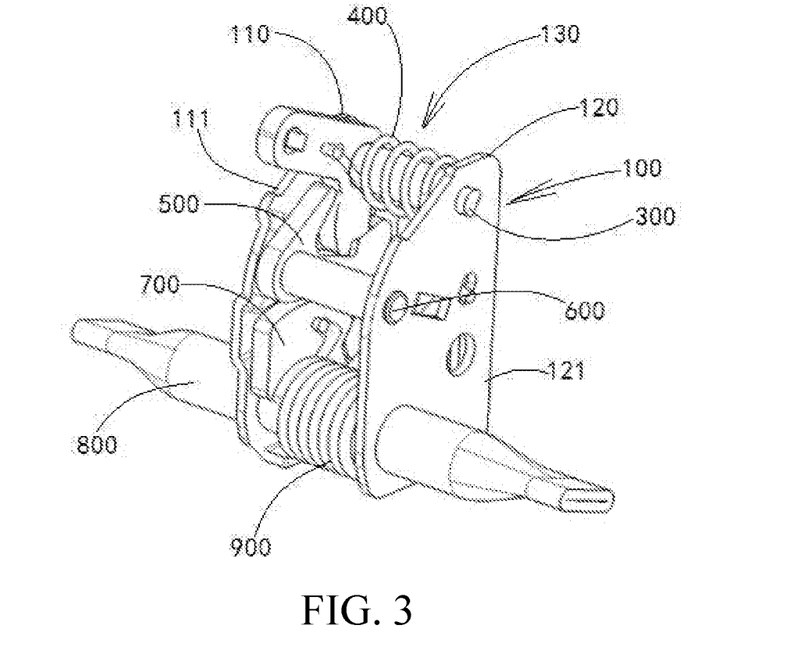
FIG. 3 is a schematic assembly view of a turnover mechanism of the invention viewed from one direction.
Figure 4:
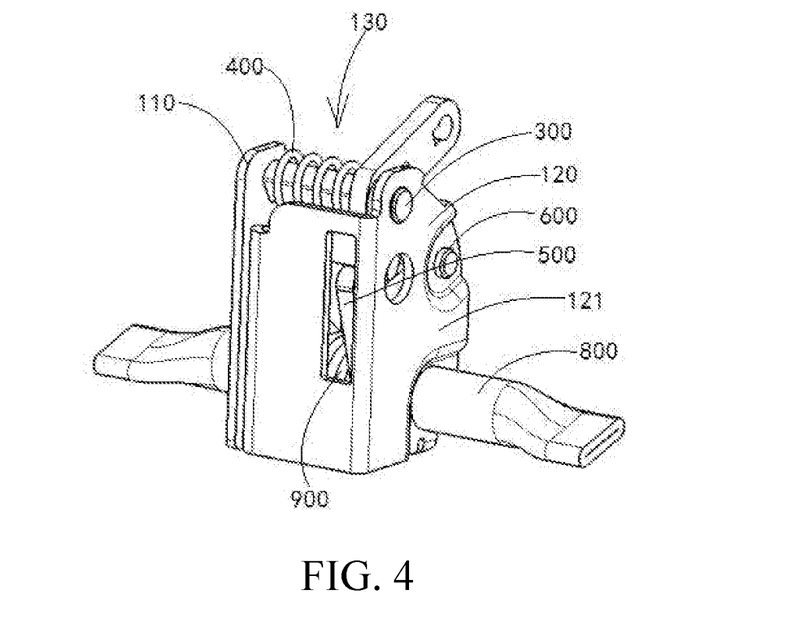
FIG. 4 is a schematic assembly view of a turnover mechanism of the invention viewed from another direction.
Figure 5:
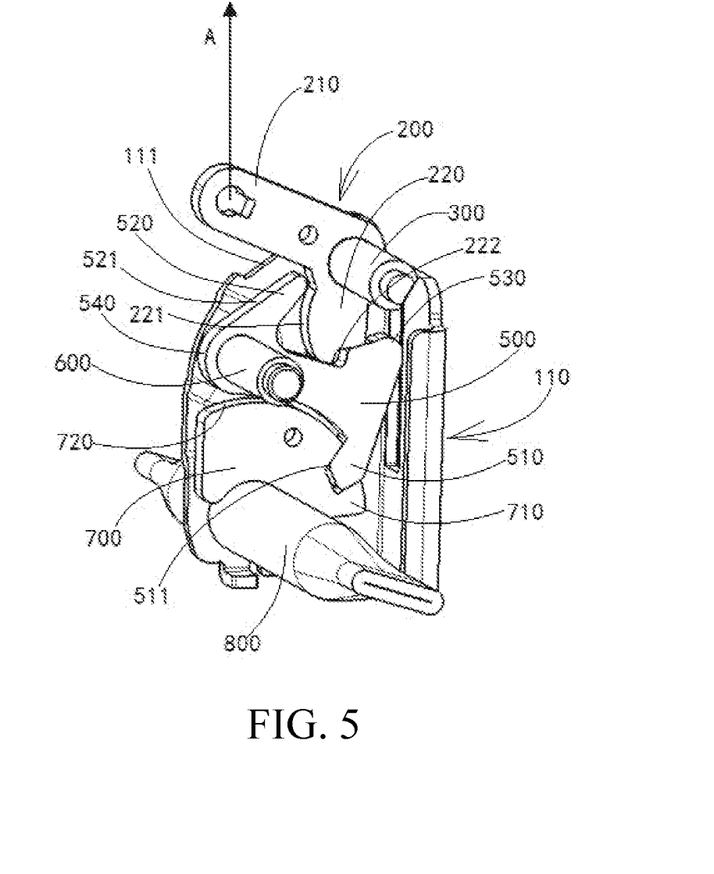
FIG. 5 is a schematic view of a turnover mechanism of the invention in a locked state.

Referring to FIG. 5, in a locked state, the first locking step surface 222 on the drive arm 220 of the cam 200 is coupled to the second locking step surface 511 on the locking pawl 510 of the locking pawl piece 500 to perform locking. The locking pawl 510 on the locking pawl piece 500 is embedded into the locking groove 710 on the locking tooth plate 700.

The rotating shaft 800 and the bracket assembly 100 are restricted from relative rotation by the locking tooth plate 700.

The first self-locking arc surface 540 on the locking pawl piece 500 is coupled to the second self-locking arc surface 720 on the locking tooth plate 700 to form self-locking.

Figure 6:
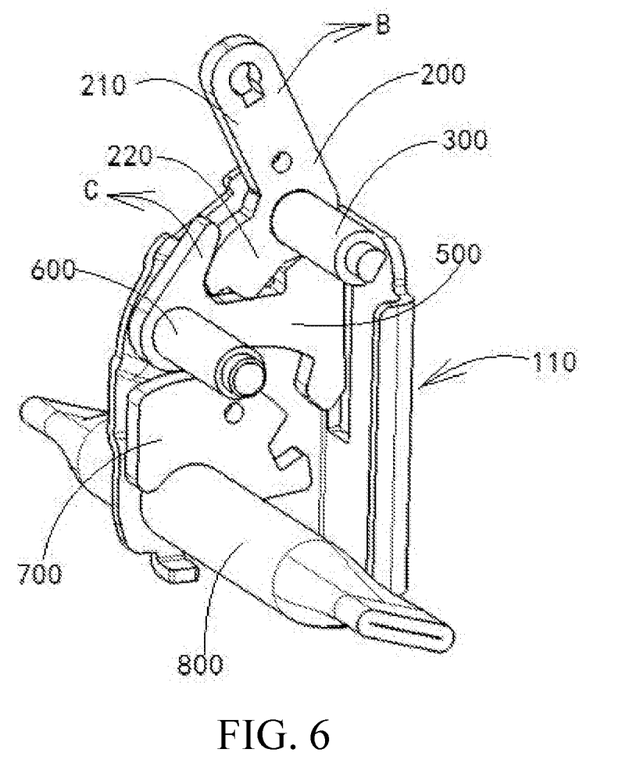
FIG. 6 is a schematic view of a turnover mechanism of the invention in an unlocked state.

Referring to FIGS. 5 and 6, in an unlocked state, a headrest turnover unlocking cable A pulls the traction arm 210 on the cam 200 to move upward. The cam 200 is pulled by the traction arm 210 to rotate around the cam shaft 300 toward a direction B in FIG. 6 to further drive the drive arm 220 to perform an unlocking operation. The unlocking arc surface 221 of the drive arm 220 drives the unlocking drive arm 520 on the locking pawl piece 500 to move toward a direction C in FIG. 6. The locking pawl piece 500 is driven by the unlocking drive arm 520 to rotate together with the pawl shaft 600. The locking pawl 510 on the locking pawl piece 500 exits from an unlocking groove 710 of the locking groove 710 on the locking tooth plate 700. The locking tooth plate 700 is unlocked.

Figure 7:
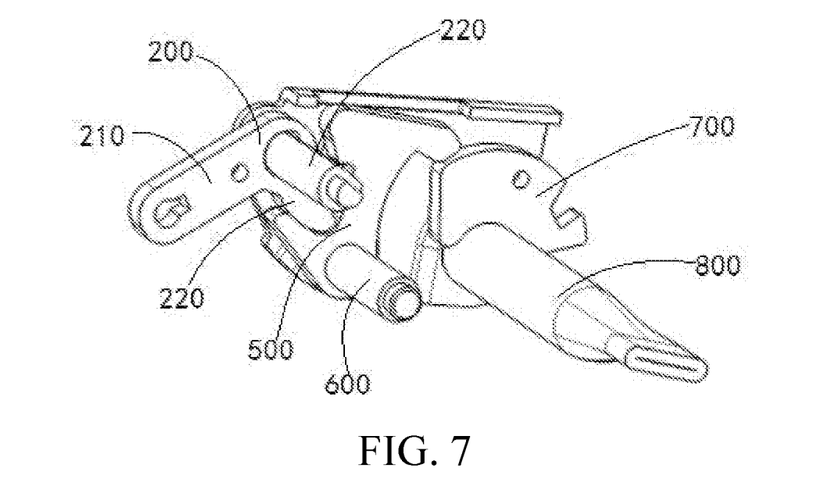
FIG. 7 is a schematic view of a turnover mechanism of the invention in a turnover state.

After the locking tooth plate 700 is unlocked, under the action of a restoring force of the rotating shaft resetting torsion spring 900, the locking tooth plate 700 and the rotating shaft 800 are driven by the rotating shaft resetting torsion spring 900 to rotate together, so that the rotating shaft 800 and the bracket assembly 100 rotate relatively.

The turnover mechanism of the invention may be used not only for driving the turning of a seat headrest, but also for turning between other moving members and fixed members. When used for driving the turning of a seat headrest, the turnover mechanism of the invention has the following two installation manners.

Figure 8:
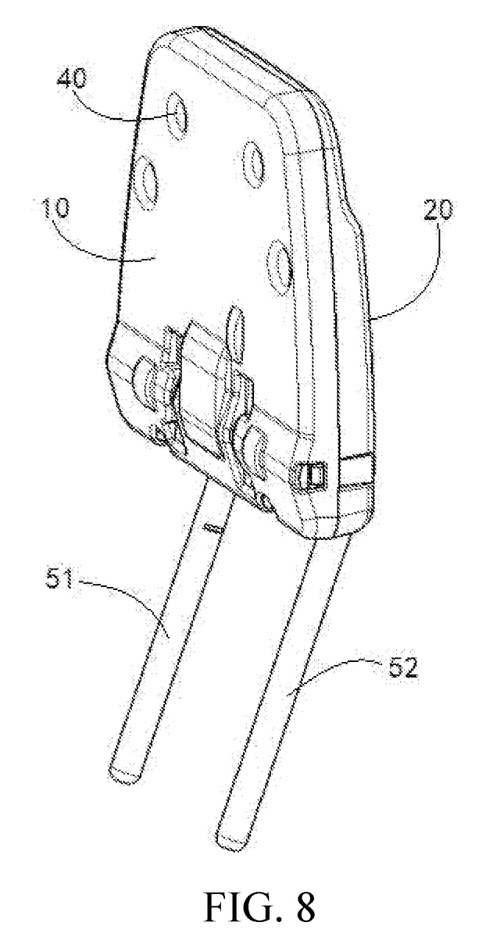
FIG. 8 is a schematic view of a headrest, in which a turnover mechanism of the invention is installed, in a locked state.
Figure 9:
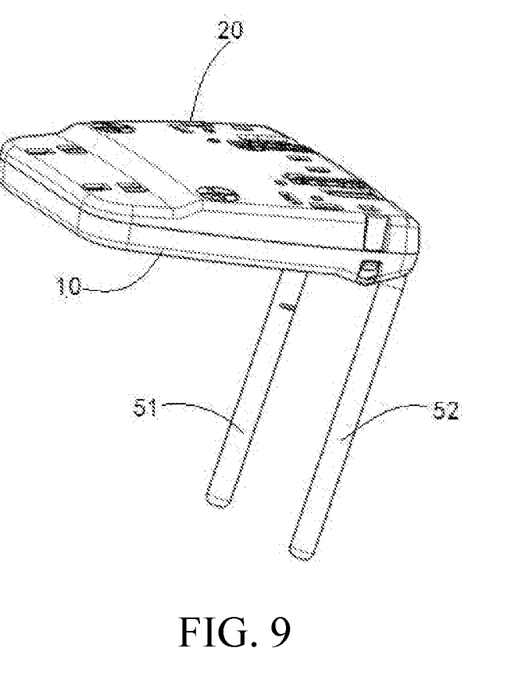
FIG. 9 is a schematic view of a headrest, in which a turnover mechanism of the invention is installed, in a turnover state.
Figure 10:
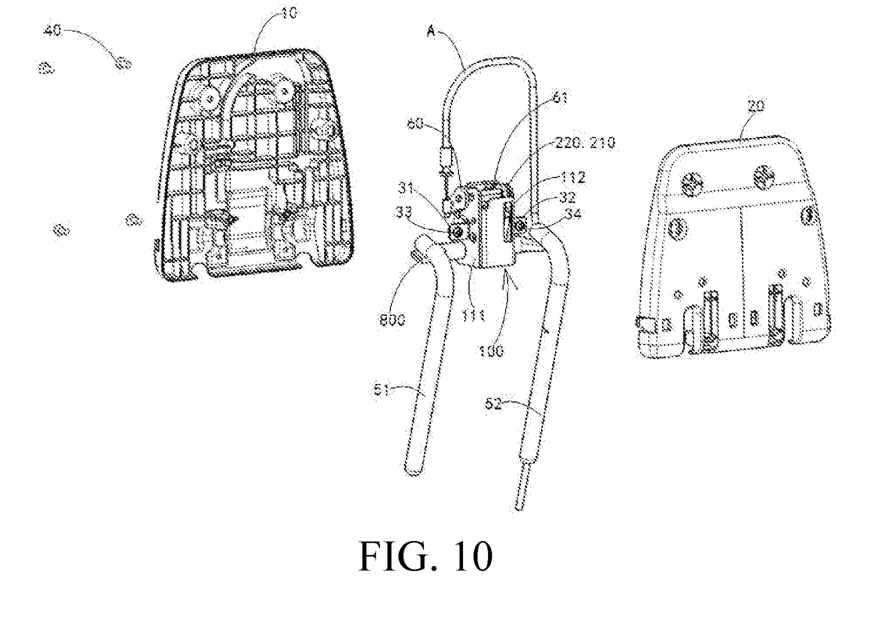
FIG. 10 is a schematic exploded view of a turnover mechanism of the invention installed in a headrest.

In the first installation manner, referring to FIGS. 8 to 10, the turnover mechanism is installed in a headrest framework. The headrest framework includes a front cover 10 and a rear cover 20. The first bracket wall 111 and the second bracket wall 121 in the bracket assembly 100 in the turnover mechanism are fixedly installed on the front cover 10 through a first fixing bracket 31, a second fixing bracket 32, a first screw 33 and a second screw 34, respectively. The rear cover 20 is fixed on the front cover 10 through a headrest screw 40. Therefore, the turnover mechanism is installed in the space between the front cover 10 and the rear cover 20. Upper ends of a pair of headrest support rods 51 and 52 are inserted into the space between the front cover 10 and the rear cover 20. Both ends of the rotating shaft 800 are in welded connection with the upper ends of the pair of headrest support rods 51 and 52. The headrest turnover unlocking cable A is led out through an inner hole of the headrest support rod 52. A cable in the headrest turnover unlocking cable A is connected to an unlocking plate 60. The unlocking plate 60 is fixed on an unlocking pin shaft 61. The unlocking pin shaft 61 is fixedly connected to the traction arm 210 in the cam 200. The cable in the headrest turnover unlocking cable A may drive, by the unlocking plate 60 and the unlocking pin shaft 61, the traction arm 210 in the cam 200 to move.

Figure 11:
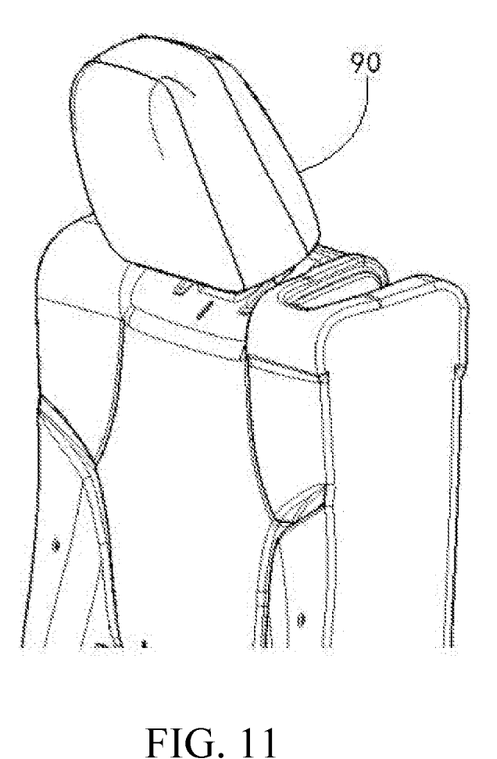
FIG. 11 is a schematic view of a turnover mechanism of the invention installed in a backrest framework with a headrest in a locked state.
Figure 12:
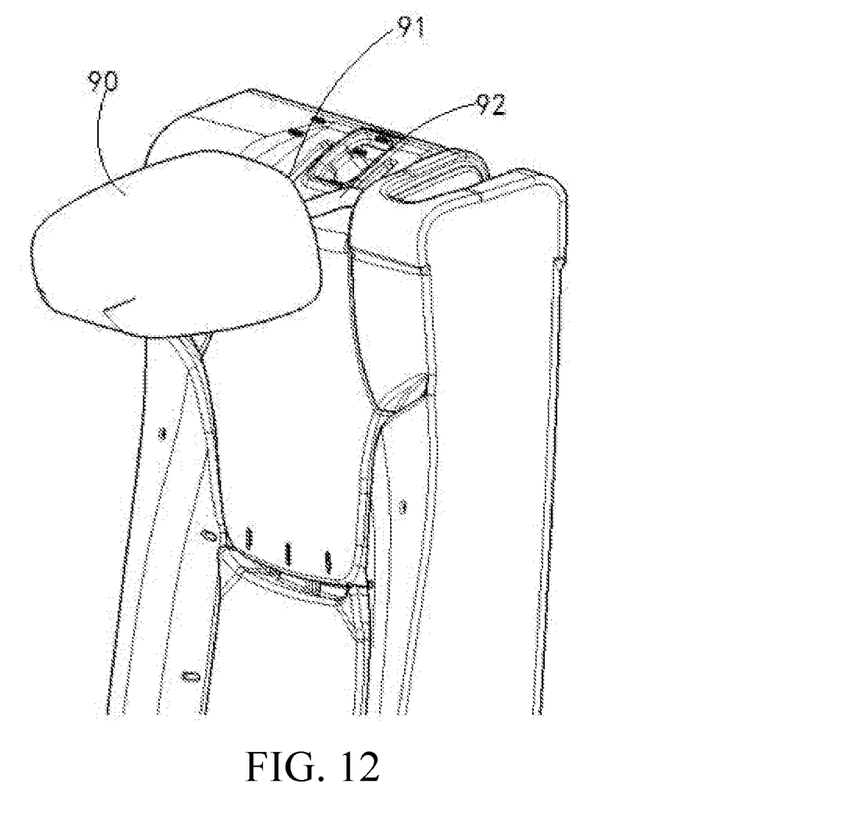
FIG. 12 is a schematic view of a turnover mechanism of the invention installed in a backrest framework with a headrest in a turnover state.
Figure 13:
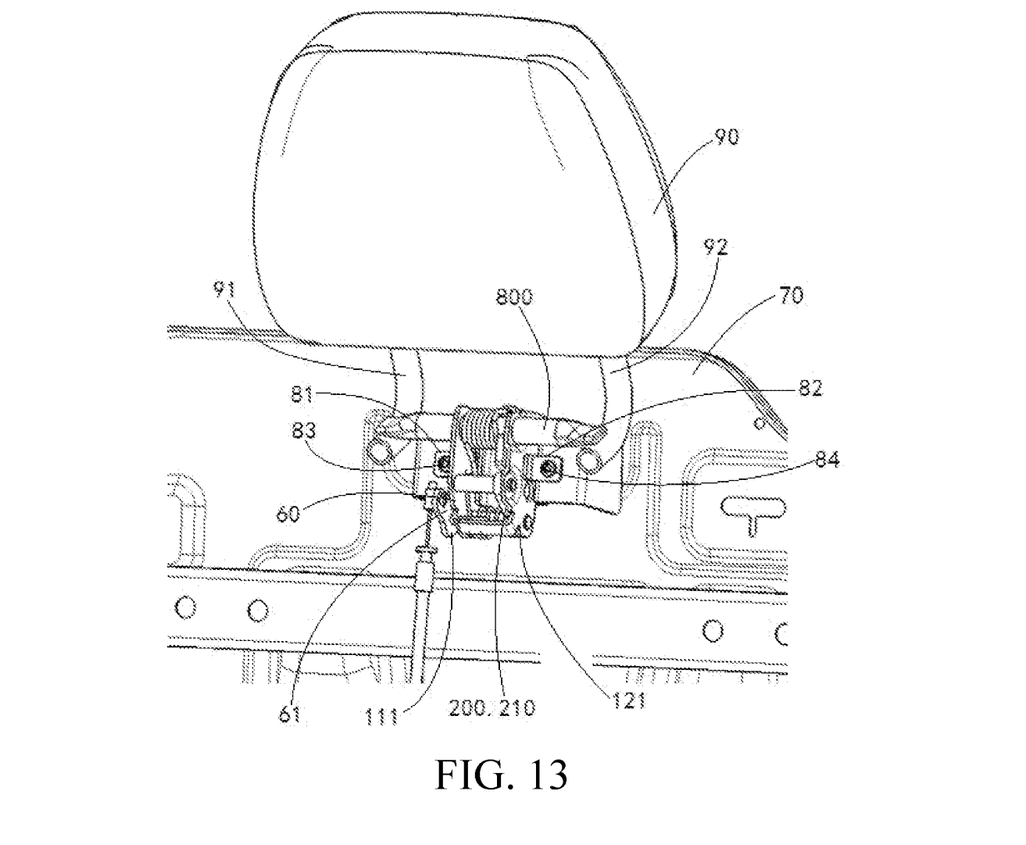
FIG. 13 is a schematic structure view of a turnover mechanism of the invention installed in a backrest framework.

In the second installation manner, referring to FIGS. 11 to 13, the turnover mechanism is installed in a backrest framework 70 of a seat. The first bracket wall 111 and the second bracket wall 121 in the bracket assembly 100 in the turnover mechanism are fixedly installed on the backrest framework 70 through a third fixing bracket 81, a fourth fixing bracket 82, a third screw 83 and a fourth screw 84, respectively. A pair of headrest support rods 91 and 92 in a headrest 90 extend into the backrest framework 70 and are in welded connection with both ends of the rotating shaft 800.

A cable in the headrest turnover unlocking cable A is connected to an unlocking plate 60. The unlocking plate 60 is fixed on an unlocking pin shaft 61. The unlocking pin shaft 61 is fixedly connected to the traction arm 210 in the cam 200. The cable in the headrest turnover unlocking cable A may drive, by the unlocking plate 60 and the unlocking pin shaft 61, the traction arm 210 in the cam 200 to move.

What is claimed is:

1. A turnover mechanism, comprising:
   a bracket assembly having a first bracket wall and a second bracket wall;
   a rotatable cam axially disposed on the bracket assembly;
   a cam resetting component connected to the cam and the bracket assembly;
   a locking pawl piece axially disposed on the bracket assembly, the cam driving the locking pawl piece to move between a locked state and an unlocked state through forward and reverse movements;
   a rotating shaft axially disposed on the bracket assembly and provided with a locking tooth plate, when the locking pawl piece is in the locked state, a locking pawl in the locking pawl piece and a locking groove on the locking tooth plate being locked and engaged, the rotating shaft and the bracket assembly being restricted from relative rotation by the locking tooth plate, when the locking pawl piece is at an unlocked position, the locking pawl in the locking pawl piece and the locking groove on the locking tooth plate being unlocked and disengaged, and the rotating shaft and the bracket assembly being rotatable relatively; and
   a rotating shaft resetting torsion spring connected to the locking tooth plate and the bracket assembly, the rotating shaft resetting torsion spring driving the locking tooth plate and the rotating shaft to rotate relative to the bracket assembly;
   wherein respective ends of the rotating shaft are fixedly connected to ends of a pair of headrest support rods, respectively;
   wherein the cam has a traction arm and a drive arm, the traction arm is connected to a headrest turnover unlocking cable, when the headrest turnover unlocking cable performs unlocking operation, the cam is pulled by the traction arm to rotate around the cam shaft to further drive the drive arm to perform an unlocking operation, and the cam resetting torsion spring pulls, by the traction arm, the cam to rotate around the cam shaft to further drive the drive arm to perform a locking operation,
   wherein the drive arm has an unlocking arc surface and a first locking step surface, the unlocking arc surface being opposite to the locking step surface;
   wherein the locking pawl piece is fixed on a pawl shaft, both ends of the pawl shaft are axially disposed on the first bracket wall and the second bracket wall, in addition to the locking pawl, the locking pawl piece also comprises an unlocking drive arm and a locking drive arm, the locking pawl is provided with a second locking step surface, the second locking step surface is coupled to the first locking step surface on the drive arm in the cam in a locked state, and an inner surface of the unlocking drive arm is coupled to the unlocking arc surface on the drive arm in the cam in an unlocked state.

2. The turnover mechanism of claim 1, wherein the bracket assembly is assembled by welding a first bracket and a second bracket, the first bracket has the first bracket wall, the second bracket has the second bracket wall, the first bracket wall and the second bracket wall are disposed oppositely and separated by a certain distance to form a part accommodating cavity, the cam, the cam resetting component, the locking pawl piece and the locking tooth plate are all located in the part accommodating cavity, the rotating shaft passes through the part accommodating cavity and is axially disposed on the first bracket wall and the second bracket wall, and both ends of the rotating shaft respectively pass through the first bracket wall and the second bracket wall.

3. The turnover mechanism of claim 2, wherein the cam is axially disposed on a cam shaft, both ends of the cam shaft are fixedly supported on the first bracket wall and the second bracket wall, the cam resetting component is a cam resetting torsion spring, the cam resetting torsion spring is wound on the cam shaft, one end of the cam resetting torsion spring acts on the cam, and the other end acts on the second bracket wall.

4. The turnover mechanism of claim 1, wherein an outer surface of the unlocking drive arm is connected to the second locking step surface of the locking pawl through a first self-locking arc surface, the locking tooth plate is provided with a second self-locking arc surface, and the first self-locking arc surface on the locking pawl piece is coupled to the second self-locking arc surface on the locking tooth plate in a locked state to form self-locking.

5. The turnover mechanism of claim 1, wherein the rotating shaft resetting torsion spring is wound on the rotating shaft, one end of the rotating shaft resetting torsion spring acts on the locking tooth plate, and the other end of the rotating shaft resetting torsion spring acts on the second bracket wall.

6. The turnover mechanism of claim 1, wherein the turnover mechanism is installed in a headrest framework, the ends of the pair of headrest support rods extending into the headrest framework, respectively, the bracket assembly is fixedly connected to the headrest framework, and the headrest framework is rotatably supported on the rotating shaft through the bracket assembly.

7. The turnover mechanism of claim 1, wherein the turnover mechanism is disposed in a backrest framework, the bracket assembly is fixedly connected to the backrest framework, the ends of the pair of headrest support rods extending into the backrest framework, respectively, and the headrest framework is rotatably supported on the bracket assembly through the pair of headrest support rods and the rotating shaft.

8. The turnover mechanism of claim 2, wherein the turnover mechanism is installed in a headrest framework, the ends of the pair of headrest support rods extending into the headrest framework, respectively, the bracket assembly is fixedly connected to the headrest framework, and the headrest framework is rotatably supported on the rotating shaft through the bracket assembly.

9. The turnover mechanism of claim 2, wherein the turnover mechanism is disposed in a backrest framework, the bracket assembly is fixedly connected to the backrest framework, the ends of the pair of headrest support rods extending into the backrest framework, respectively, and the headrest framework is rotatably supported on the bracket assembly through the pair of headrest support rods and the rotating shaft.

10. The turnover mechanism of claim 3, wherein the turnover mechanism is installed in a headrest framework, the ends of the pair of headrest support rods extending into the headrest framework, respectively, the bracket assembly is fixedly connected to the headrest framework, and the headrest framework is rotatably supported on the rotating shaft through the bracket assembly.

11. The turnover mechanism of claim 3, wherein the turnover mechanism is disposed in a backrest framework, the bracket assembly is fixedly connected to the backrest framework, the ends of the pair of headrest support rods extending into the backrest framework, respectively, and the headrest framework is rotatably supported on the bracket assembly through the pair of headrest support rods and the rotating shaft.

* * * * *